2,967,763

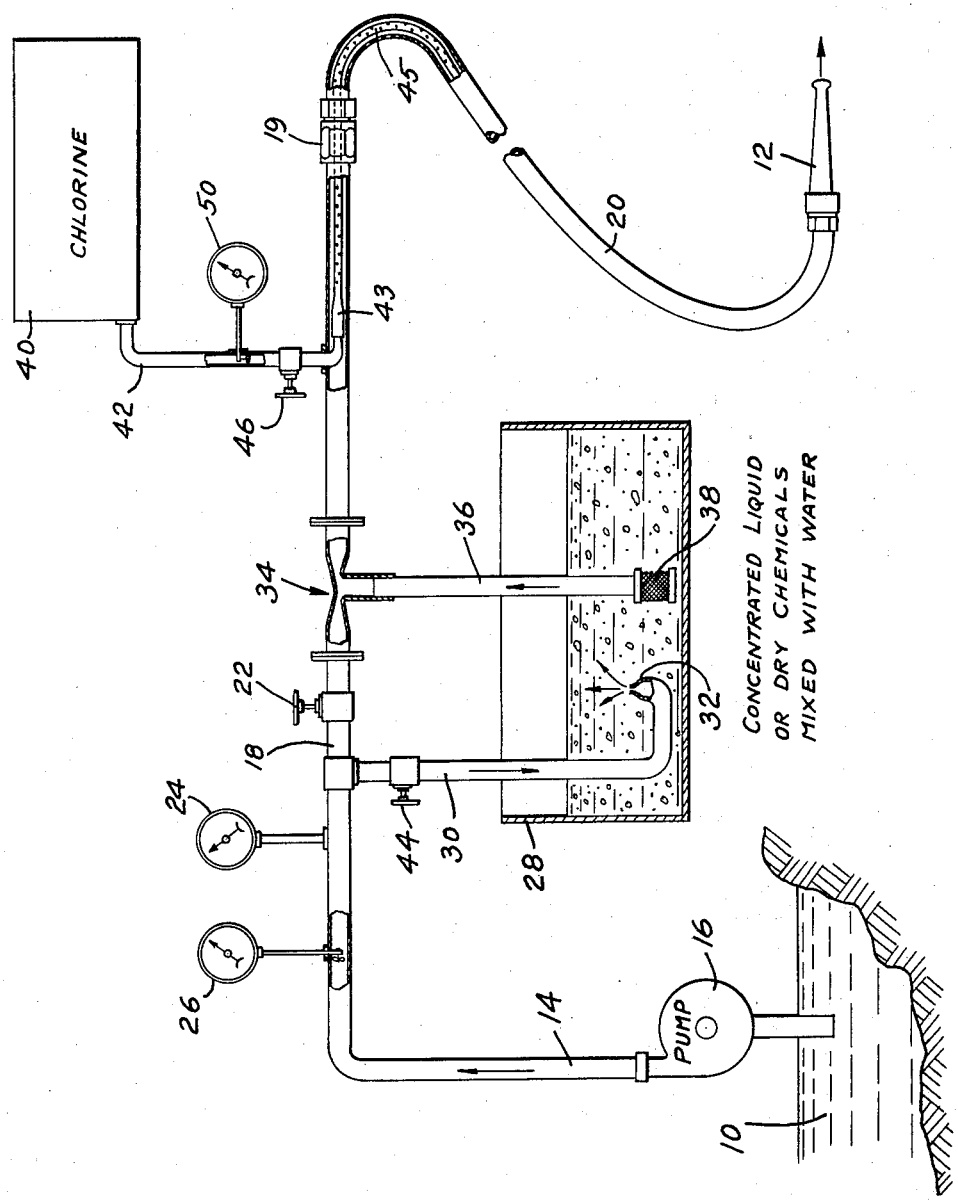

APPARATUS FOR PRODUCING A DECONTAMINATING SOLUTION

John J. Doman, Camarillo, and Jay R. Dawes, Oxnard, Calif., assignors to the United States of America as represented by the Secretary of the Navy Filed May 16, 1957, Ser. No. 659,737

4 Claims. (Cl. 23—252)

(Granted under Title 35, U.S. Code (1952), sec. 266)

The invention described herein may be manufactured and used by or for the Government of the United States of America for governmental purposes without the payment of any royalties thereon or therefor.

This invention relates to an apparatus for producing a continuous supply of liquid for neutralization or decontamination of surfaces which have been contaminated by reagents used in chemical or biological warfare.

In warfare of the type indicated, there is need for a light-weight, portable apparatus which can utilize any available supply of water, fresh or salt, to produce a decontaminating liquid which can be passed through a hose in a continuous stream to be applied to the areas affected. The apparatus should be of such construction that it can be set up quickly and operated by unskilled personnel without unnecessary complications. Its conduits should be of simple and straight design to minimize clogging where the available water contains foreign matter.

An object of the present invention is to provide an apparatus of the type just indicated and which is of simple and rugged construction.

Further objects and many of the attendant advantages of this invention will be readily appreciated as the same becomes better understood by reference to the following description taken in connection with the drawing, in which the single figure is a diagrammatic representation of an apparatus embodying the invention.

The apparatus shown in the drawing is particularly designed for the continuous production of a solution of calcium or sodium hypochlorite, that being a useful decontaminant for the purposes above stated. However, it will be obvious that the mechanism can with slight changes be modified to produce other decontaminating liquids.

The apparatus comprises a conduit extending from a source of water 10 to a nozzle 12 adjacent the contaminated area. The conduit includes a tubular member 14 having therein a pump 16 driven manually or from any suitable source of power, not shown. Member 14 connects with a transverse pipe 18 which is connected at 19 with a hose 20 terminating in the nozzle 12. Rate of flow through pipe 18 may be controlled by a manual valve 22, and the pressure and rate of flow through the pipe may be ascertained by pressure gage 24 and flowmeter 26.

Beneath pipe 18 is a tank 28 containing a quantity of hydrated lime or other suitable liquid or comminuted dry reagent. A branch conduit 30 leads from pipe 18 to the tank to deliver a stream of water thereto, the branch having its outlet end 32 formed and positioned to agitate the lime and cause it to mix with the water to form a slurry.

Pipe 18 is formed with a venturi 34, and an induction pipe 36 extends from adjacent the bottom of the tank to the venturi to draw the slurry upwardly into the pipe 18, to mix with the water flowing therethrough. Since the water from source 10 may contain solid foreign matter, a strainer 38 is provided at the inlet of pipe 36.

A tank 40 contains chlorine or other liquid or gaseous reagent under pressure, and is connected to pipe 18 by a tube 42 which is connected at 43 to a perforated flexible conduit 45 designed to diffuse the chlorine into the water in the pipe to react with the slurry to form a solution of calcium or sodium hypochlorite. Manually operated valves 44 and 46 are provided to control flow through branch 30 and tube 42 respectively, flowmeter 50 serving to measure the flow through the latter.

In operation, the pump 16 may be started with valve 22 open, valves 44 and 46 being gradually opened and adjusted until the correct proportions of ingredients are obtained and the proper pressure produced at the nozzle to facilitate application of the resulting solution to the contaminated area.

Obviously many modifications and variations of the present invention are possible in the light of the above teachings. It is therefore to be understood that within the scope of the appended claims the invention may be practiced otherwise than as specifically described.

What is claimed is:

1. A portable decontaminating apparatus for producing a continuous pressurized stream of an aqueous solution of calcium hypochlorite comprising in combination:

a main conduit having an inlet section and an outlet section;

a natural water source;

pumping means for delivering water from said natural source to said inlet section of said main conduit;

an open top mixing tank for holding a supply of comminuted lime; said tank having a bottom and an upwardly extending wall structure;

a branch conduit leading from said inlet section to the interior of said tank, said branch conduit terminating near said tank bottom in an upwardly extending simple nozzle, and said branch conduit delivering water to the lime in said tank whereby a lime slurry is formed;

a venturi-aspirator connecting said inlet section and said outlet section;

an inlet tube leading from said tank to the throat of said venturi aspirator whereby a portion of the said lime slurry is drawn into the stream of water passing through said venturi-aspirator;

a flexible hose coupled to the outboard delivery end of said outlet section, said flexible hose terminating in a simple delivery nozzle for spraying said solution over the area or object to be decontaminated;

a source of chlorine under pressure; and means for introducing said chlorine under pressure into the outboard end of said outlet section and said hose in the direction of flow centrally of said stream whereby the pressure of said water and lime slurry solution is augmented by the pressure of said chlorine and whereby said chlorine is intimately mixed with said lime slurry to produce said pressurized stream of calcium hypochlorite solution.

2. A portable decontaminating apparatus as claimed in claim 1 wherein said means for introducing said chlorine under pressure into said outlet section comprises a longitudinal gas nozzle inserted in said outlet section;

a tube connection leading from the inboard end of said nozzle through the wall of said outlet section to said chlorine source;

sealing means for sealing said tube to said wall of said outlet section; and a perforated flexible conduit secured to the outboard end of said gas nozzle, said perforated conduit extending through the outboard end of said outlet section and substantially into said flexible hose.

3. A portable decontaminating apparatus for producing a continuous pressurized stream of an aqueous diluted solution of decontaminating fluid comprising, in combination:

a main conduit having an inlet section and an outlet section;

a venturi-aspirator joining said inlet and outlet sections;

means for supplying water under pressure to said inlet section;

an open tank for receiving a quantity of comminuted dry reagent;

a branch conduit leading from said inlet section to the interior of said tank, said branch conduit terminating near the bottom of said tank in an upwardly extending simple nozzle and said conduit and nozzle delivering water to the dry reagent in said tank whereby a dry reagent slurry is formed;

an inlet tube extending from a point near the bottom of said tank to the throat of said venturi-aspirator whereby a portion of the said slurry is sucked into the stream of water passing through said venturi-aspirator;

a flexible hose coupled to the outboard end of said outlet section, said flexible hose terminating in a simple delivery nozzle for spraying said decontaminating fluid over the area or object to be decontaminated;

a source of fluid reagent under pressure; and means for introducing said fluid reagent under pressure into the said outlet section and said hose in the direction of flow through said main conduit and flexible hose whereby the pressure of said water and slurry is augmented by the pressure of said fluid reagent and whereby said fluid reagent is intimately mixed with said slurry to produce said pressurized stream of decontaminating fluid.

4. A portable, light weight decontaminating apparatus for producing a continuous pressurized stream of aqueous diluted solution of decontaminating fluid comprising, in combination:

a main conduit having an inlet section and an outlet section;

a venturi-aspirator joining said inlet and outlet section;

means for supplying water under pressure to said inlet section;

an open tank for receiving a quantity of a first reagent;

a branch conduit leading from said inlet section to the interior of said tank, said branch conduit terminating near the bottom of said tank in an upwardly extending, simple nozzle and said branch conduit and nozzle delivering water to the first reagent in said tank whereby an aqueous mixture of said first reagent is formed;

an induction pipe extending from a point near the bottom of said tank to the throat of said venturi-aspirator whereby a portion of the said mixture is introduced into the stream of water passing through said venturi-aspirator;

a flexible hose coupled to the outboard end of said outlet section, said flexible hose terminating in a simple nozzle for spraying said decontaminating fluid over the area or object to be decontaminated;

a second fluid reagent under pressure; and means for introducing said second fluid reagent under pressure into the said outlet section and said hose in the direction of flow through said main conduit and flexible hose whereby the pressure of said water and aqueous mixture is augmented by the pressure of said second fluid reagent and whereby said fluid reagent is intimately mixed with said water and said aqueous mixture to produce said pressurized stream of decontaminating fluid.

References Cited in the file of this patent

UNITED STATES PATENTS

| | | |
|---|---|---|
| 956,101 | Inglis | Apr. 26, 1910 |
| 1,747,687 | Wheeler | Feb. 18, 1930 |
| 1,962,571 | Ornstein | June 12, 1934 |
| 2,361,150 | Petroe | Oct. 24, 1944 |
| 2,587,845 | Hiller et al. | Mar. 4, 1952 |
| 2,683,622 | Dragon | July 13, 1954 |